Figure 16:
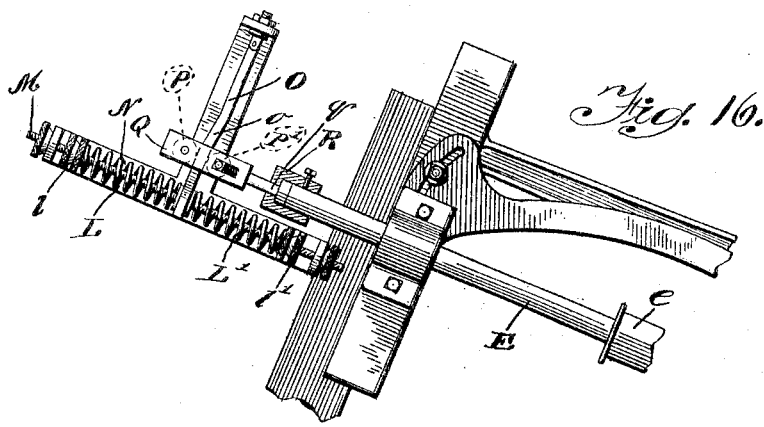

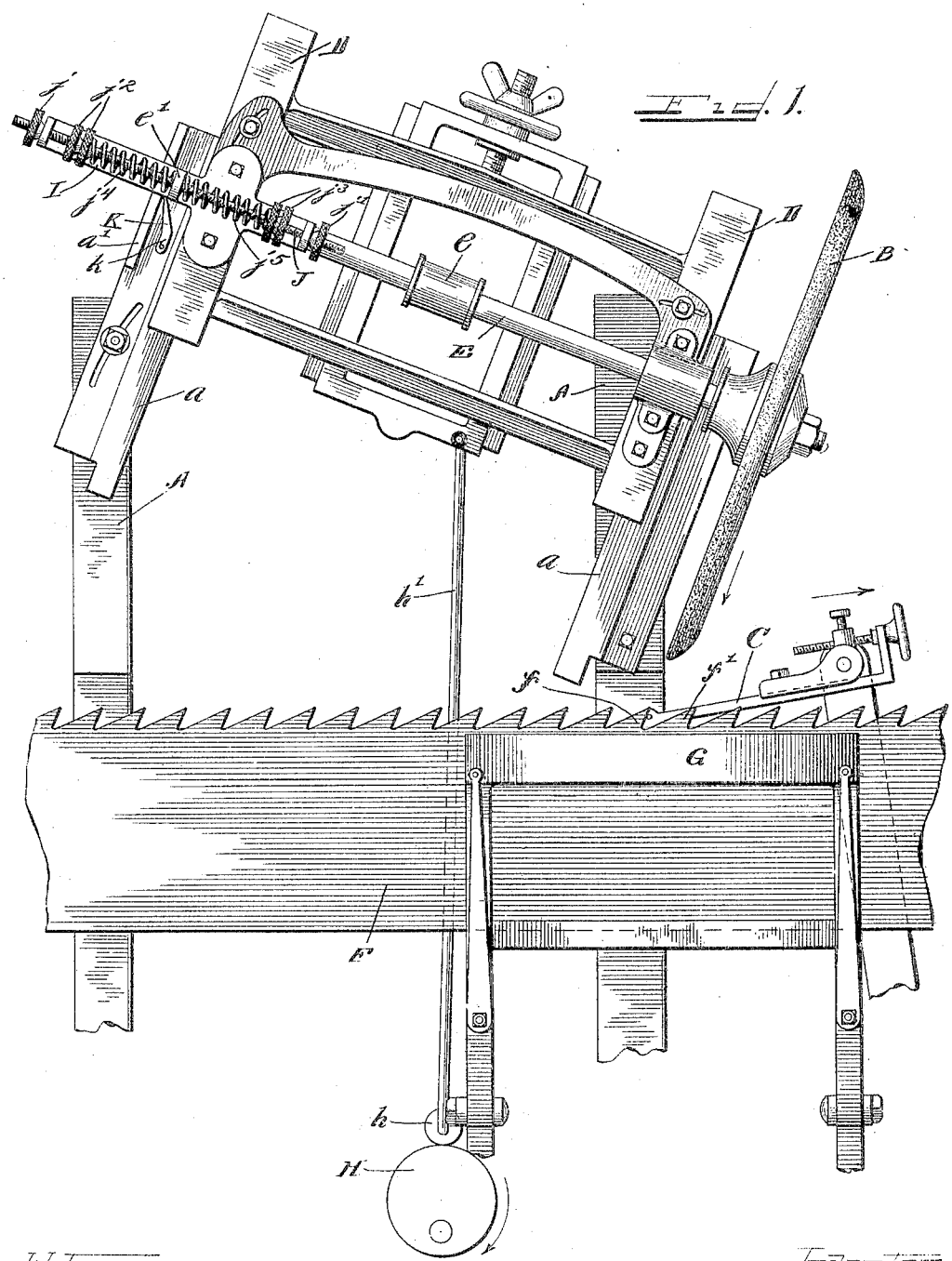

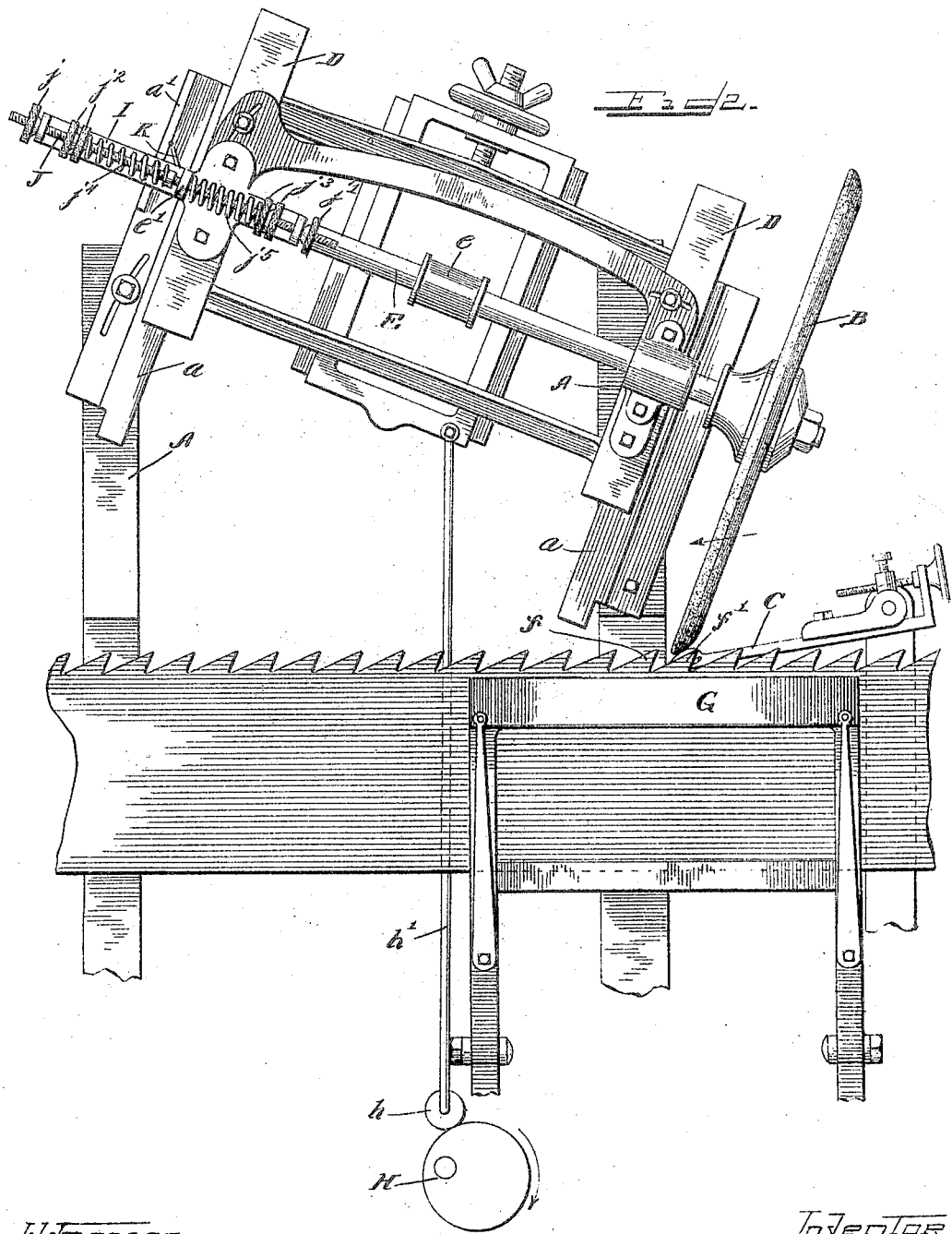

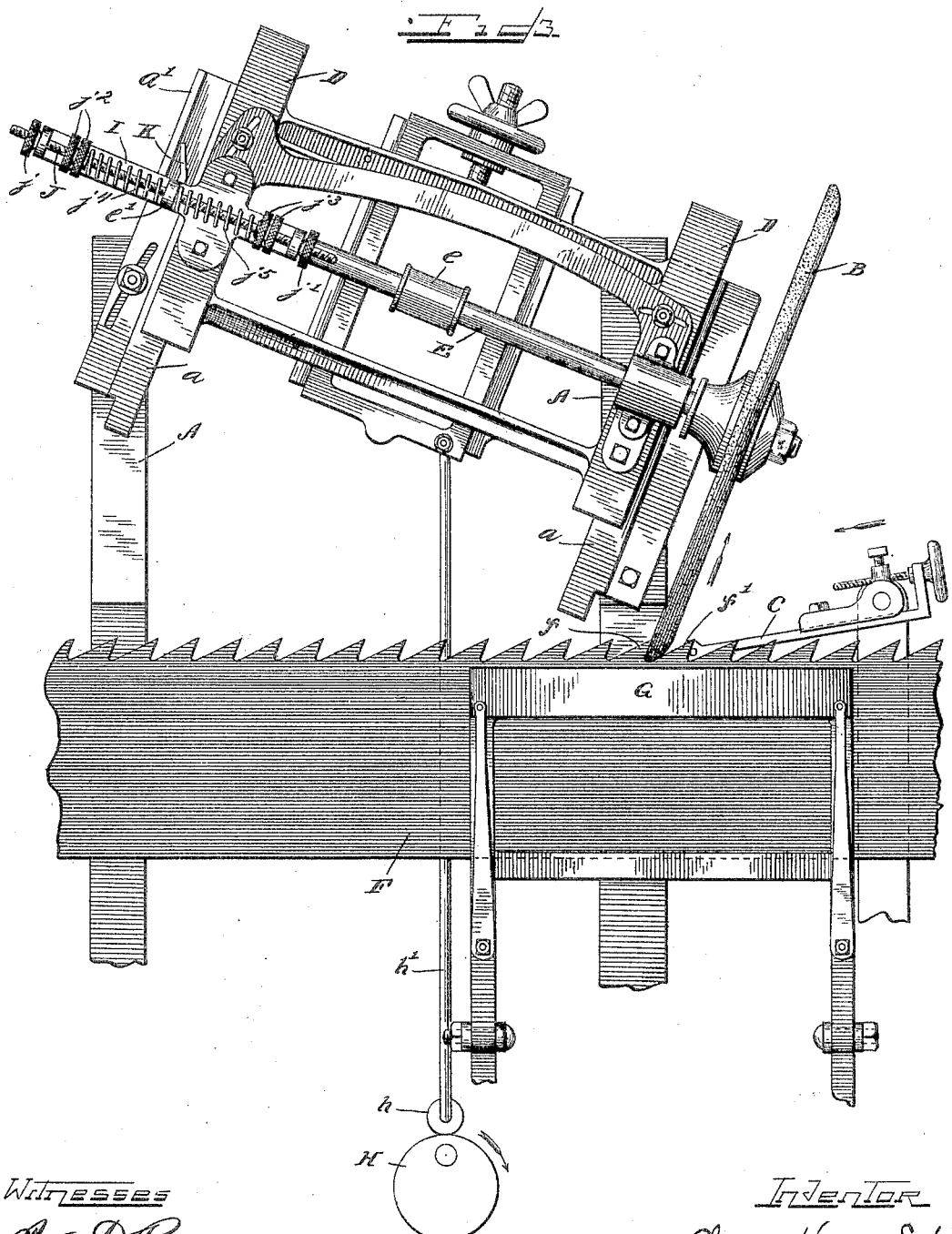

No. 802,528. PATENTED OCT. 24, 1905.
J. H. SEEK.
SAW SHARPENING MACHINE.
APPLICATION FILED DEC. 7, 1901.
7 SHEETS—SHEET 4.
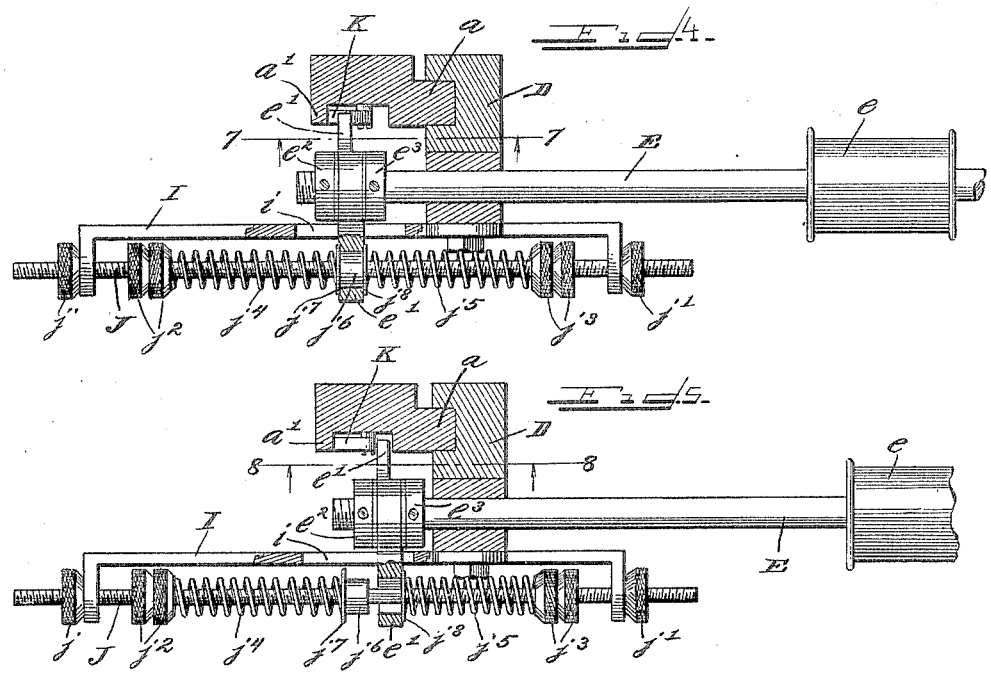
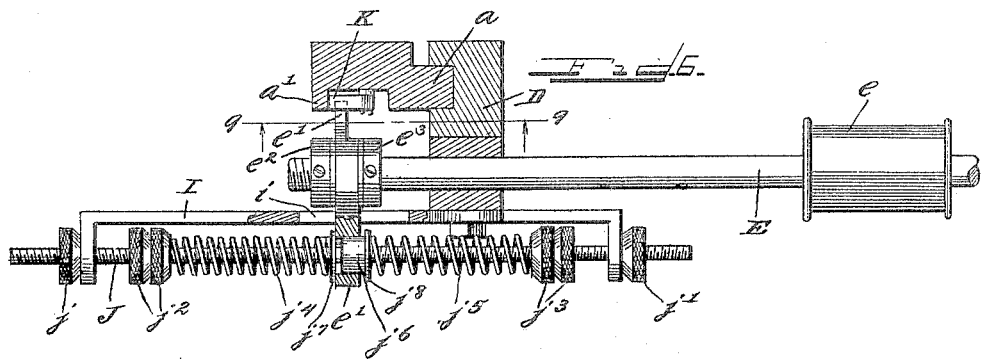

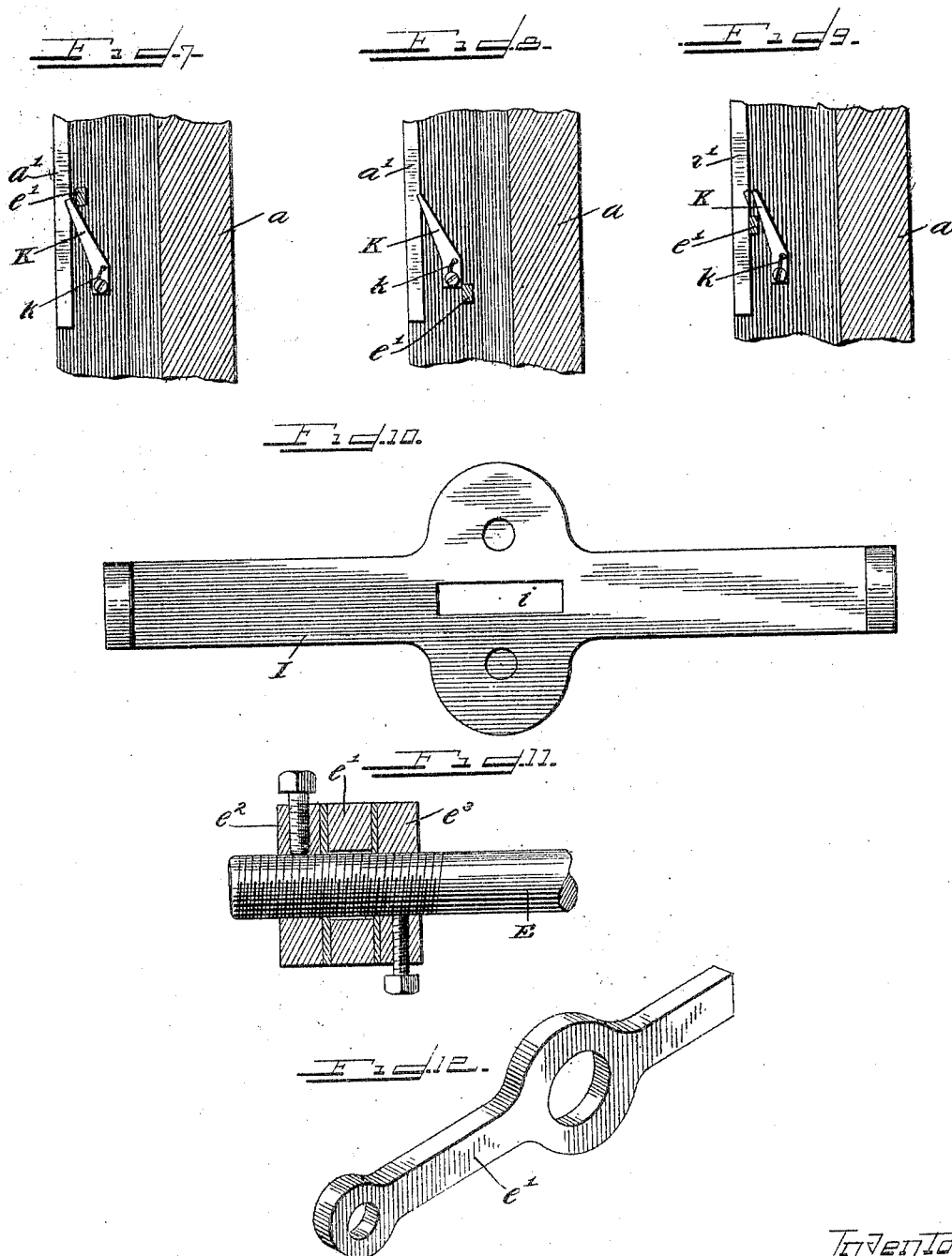

No. 802,528. PATENTED OCT. 24, 1905.
J. H. SEEK.
SAW SHARPENING MACHINE.
APPLICATION FILED DEC. 7, 1901.
7 SHEETS—SHEET 6.
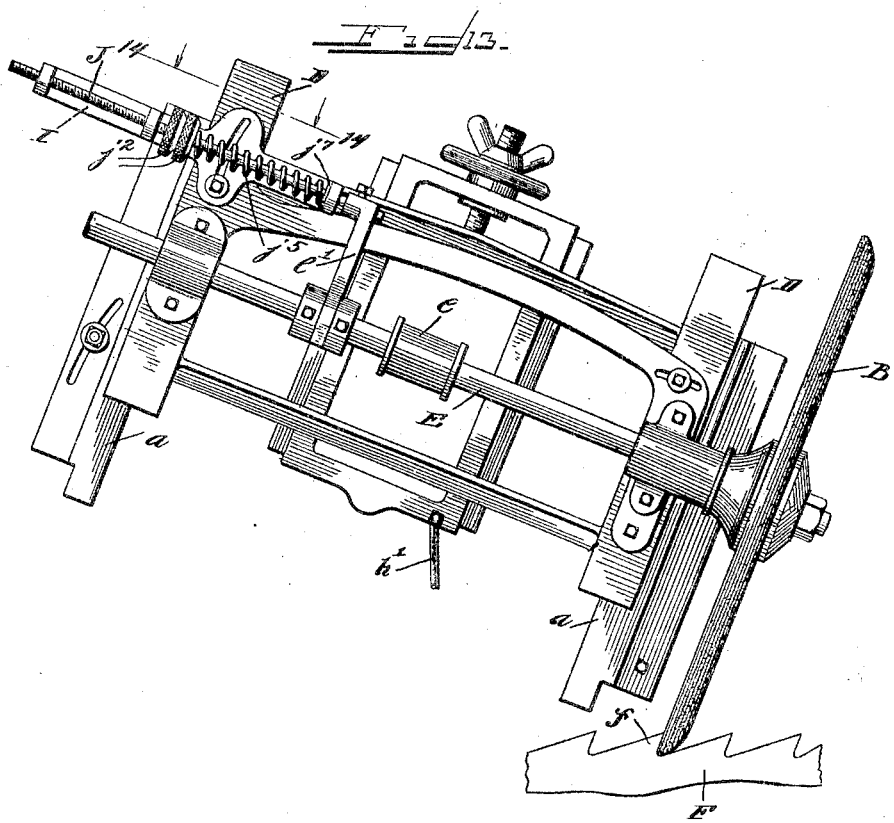
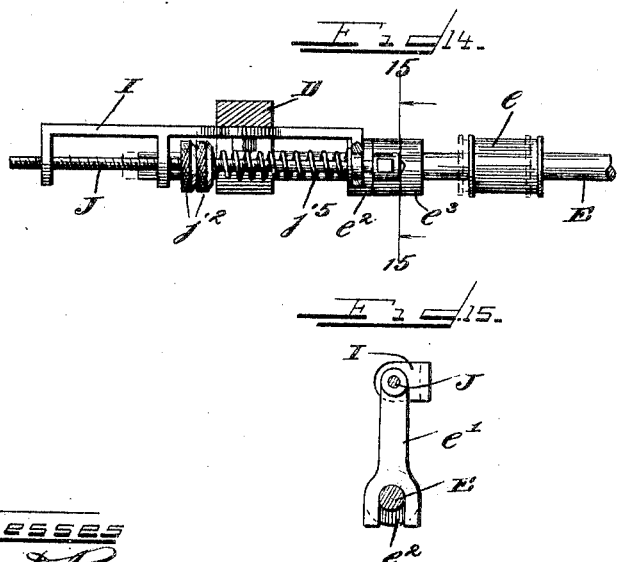

No. 802,528. PATENTED OCT. 24, 1905.
J. H. SEEK.
SAW SHARPENING MACHINE.
APPLICATION FILED DEC. 7, 1901.

7 SHEETS—SHEET 7.

Witnesses:
Ira D. Perry
Robert H. Weir

Inventor:
James Harry Seek,
by Chas. T. Bulkle
Atty

UNITED STATES PATENT OFFICE.

JAMES HARRY SEEK, OF CHICAGO, ILLINOIS.

SAW-SHARPENING MACHINE.

No. 802,528. Specification of Letters Patent. Patented Oct. 24, 1905.

Application filed December 7, 1901. Serial No. 84,998.

*To all whom it may concern:*

Be it known that I, JAMES HARRY SEEK, a citizen of the United States, residing at Chicago, in the county of Cook and State of Illinois, have invented a certain new and useful Improvement in Saw-Sharpening Machines, of which the following is a specification.

My invention may be used, for example, in connection with a saw-sharpening machine of the character shown in Patent No. 523,883, issued July 31, 1894, and in other patents for machines of the same general and well-known class.

My invention relates to saw-sharpening machines in general, but more particularly to machines which are adapted for sharpening band-saws. Machines of this character are usually provided with a rotary disk or grinding-wheel and also with a shifting or reciprocating head or support. The said rotary disk or grinding-wheel is usually mounted upon a rotary shaft or spindle arranged in suitable bearings on said head or movable support. The rotary disk or grinding-wheel thus mounted is ordinarily supported above the teeth of the saw to be sharpened. Suitable means are provided for rotating the spindle or shaft upon which the disk or grinding-wheel is mounted, and means are also provided to permit the driving power to give the said head or support the proper up-and-down or bodily-reciprocating movement. In a machine of this character it is also desirable to provide suitable feeding mechanism for giving the saw an intermittent feeding movement, so as to successively bring the teeth into position to be ground by the rotary disk or abrading-wheel. In operation the disk or grinding-wheel is rotated and the head is moved downward to an extent to bring the disk or grinding-wheel into engagement with the teeth of the saw to be sharpened. The face of a tooth is first engaged and ground by the grinding-wheel, and the feeding mechanism then causes the saw to feed forward, so as to permit the grinding-wheel to practically ride up the inclined back of the next or succeeding tooth. The saw being moved or fed forward to the proper extent, the disk or grinding-wheel is then caused to move downward and engage and grind the face of the said next or succeeding tooth. In this way the relative movements of the saw and grinding-wheel are such that the latter first engages the face of a tooth, then engages and grinds the beveled or inclined back of the next tooth— that is, moves into engagement with the back of this said next tooth—and then continues this alternate grinding of the backs and faces of the teeth for the full length of the saw. As ordinarily constructed a saw-sharpening machine of this character operates in such manner that the rotary disk or grinding-wheel engages each tooth with a positive and unyielding pressure—that is to say, the disk or grinding-wheel is mounted and controlled in such manner that it is capable of no bodily shift or movement relatively to the shifting or moving head. For this reason, as ordinarily mounted and operated, the rotary disk or grinding-wheel is apt to at times operate in a more or less unsatisfactory manner, inasmuch as the teeth of the saw to be sharpened are liable to be of different shapes or sizes, and for the further reason that the feeding mechanism is sometimes of such character that it is liable to at times cause variations in the intermittent feeding movement of the saw. For example, the saw to be sharpened may have teeth the majority of which are of practically the same shape and size; but there may also be a number of teeth which are somewhat larger and of different shape than the others. With a saw of this character it will be readily seen that the uniform and unvarying movement of the grinding-wheel will operate to satisfactorily grind and sharpen the teeth which are uniform with respect to size and shape; but it will also be readily seen that when the disk or grinding-wheel encounters a relatively larger or improperly-proportioned tooth then the pressure exerted upon such tooth is too great and that as a result thereof the tooth is liable to be broken or case-hardened. This breaking and case-hardening of the saw-teeth may also occur as a result of variations in the feeding movement of the saw—that is to say, the feeding mechanism may not give the tooth the requisite extent of feed—and in such case the rotary disk or grinding-wheel is liable to strike the point of a tooth with sufficient force and pressure to break the tooth. Again, the feeding mechanism may, as a result of being improperly timed, cause the saw to feed too quickly, and in such case the inclined back of the tooth to be ground is crowded or forced against the disk or grinding-wheel in such manner that the tooth is either ground too much, broken, or case-hardened. In this way it will be readily seen that the unyielding pressure of the disk or grinding-wheel of these machines as ordinarily constructed is calculated to cause trouble and uncertainty in the sharpening of saws.

Generally stated, it is the object, therefore, of my invention to provide a saw-sharpening machine which will insure against breakage and improper grinding of the saw-teeth and also against case-hardening regardless of variations in the size and shape of the teeth and also regardless of variations in the feeding movement of the saw.

More specifically stated, it is the object of my invention to provide a saw-shapening machine in which the rotary disk or grinding-wheel is controlled by spring pressure or tension, so as to permit the said disk or wheel to be applied to the saw-teeth with a yielding pressure.

A further object of my invention is to provide simple and effective means whereby the disk or grinding-wheel may be caused to approach the face of a tooth in a manner calculated not to cause breakage or other injurious effects. With the disk or grinding-wheel thus operated and controlled it is also an object of my invention to provide simple and effective means for varying the tension of the spring means which cause the said yielding pressure of the grinding-wheel upon the saw-teeth.

With these general and specific objects in view the rotary disk or grinding-wheel of my improved saw-sharpening machine is preferably adapted and arranged for bodily shift or movement in the direction of its axis. In other words, I provide an arrangement and construction whereby the rotary spindle or shaft upon which the disk or grinding-wheel is mounted is capable of longitudinal shift or end movement. While the spindle or rotary shaft is thus capable of longitudinal shift or end movement, it is preferably normally held against such shift or end movement by suitably-arranged spring means or yielding connections. Thus mounted and controlled by spring pressure or tension the rotary disk or grinding-wheel is capable of engaging a saw-tooth with a yielding pressure and not with such a positive thrust or pressure as would be likely to break or grind away too large a portion of the tooth. In this way the rotary disk or grinding-wheel will yield slightly when it is brought into engagement with a tooth which is larger than the others, and there will also be a similar desirable and advantageous yielding on the part of the disk or wheel in case of variations in the feeding movement of the saw. In other words, with my improved arrangement the machine can be adjusted with reference to saw-teeth of a certain size, and after thus being adjusted and started in operation no breakage or case-hardening and no undue grinding will occur as a result of the disk or grinding-wheel encountering a tooth which is either larger or of different shape than the others. Furthermore, in machines of this character the feeding action or movement of the saw is liable to vary to some extent, and in such case the springs permit the disk or grinding-wheel to practically adjust itself automatically to such change or variations in the feeding movement. In this way with my improved arrangement the rotary disk or grinding-wheel may not only be said to practically adjust itself automatically with respect to variations in the size and shape of the saw-teeth, but also with respect to variations in the manner in which teeth of the same size and shape are presented or placed in position for grinding. As a matter of further improvement the movement of the disk or grinding-wheel is such that it is not liable to come down on top of the saw-tooth. Ordinarily in machines of this character the movement of the rotary disk or grinding-wheel is such that it moves directly downward and has a direct downward or sliding contact with the face of a tooth. With my improved machine, however, the disk or grinding-wheel in grinding the face of a tooth first moves downward to a point between the tooth to be sharpened and the next succeeding tooth and is then allowed to move forward and engage the face of the tooth with a yielding pressure. By thus causing the disk or grinding-wheel to move horizontally when approaching and engaging the face of a saw-tooth and by allowing the disk or wheel to engage the face of a tooth with a yielding pressure all liability of breakage as a result of a direct downward pressure of the disk or grinding-wheel upon the point of a tooth is avoided. In other words, with my improved arrangement the disk or grinding-wheel moves horizontally and parallel with the saw in engaging the face of a tooth. In approaching the face of a saw-tooth in this manner the disk or wheel is not liable to cause breakage, undue grinding, or case-hardening, and insures a proper sharpening or grinding action on each tooth regardless of either variations in the size or shape of the teeth or in the feeding movement of the saw. Any suitable device or means can be employed for causing the disk or grinding-wheel to approach the face of a saw-tooth in this manner; but as a simple and effective arrangement the rotary spindle or shaft carrying such disk or wheel is preferably and at the right time given a longitudinal or end movement by a suitably-arranged device which is preferably in the nature of a cam or an inclined plane. It will be readily understood, however, that this feature of my invention, as well as the manner of applying the spring means or yielding connections, can be varied or changed to suit the conditions and in accordance with different kinds of work. The nature and advantages of my invention will, however, hereinafter more fully appear.

Figure 17:
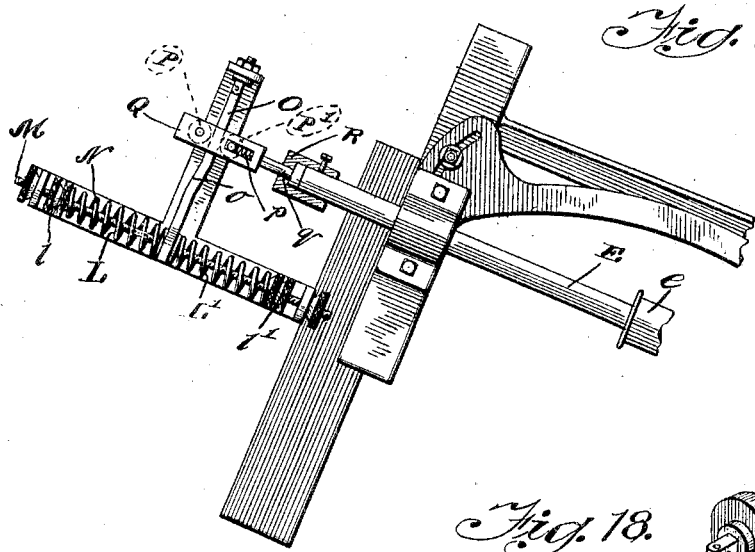
Figure 18:
Figure 19:
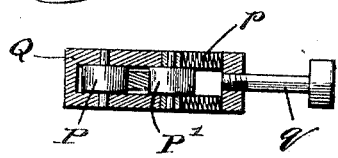

In the accompanying drawings, Figure 1 is a front elevation of a portion of a saw-sharpening machine to which my invention relates and embodying the principles of my invention. In this view the head which carries the spindle and grinding-wheel is shown at the limit of its upstroke. Fig. 2 is a view similar to Fig. 1; but in this view the head and the disk are shown lowered into position to bring the periphery or edge of the grinding-disk between two of the saw-teeth. Fig. 3 is also a view similar to Fig. 1; but in this view the sliding head is at the limit of its downstroke and the rotary disk or grinding-wheel is bearing upon the bottom of the notch between the two saw-teeth. Fig. 4 is a detail sectional plan view of a portion of the spindle and of the spring or yielding connections between this spindle and the adjacent framework. In this figure the parts are in the same position as in Fig. 1. Fig. 5 is a view similar to Fig. 4, showing the parts in a position corresponding to the position shown in Fig. 2. Fig. 6 is also a view similar to Fig. 4. In this view, however, the parts are shown in positions which correspond to the positions or condition of the machine shown in Fig. 3. Figs. 7, 8, and 9 illustrate a cam device for causing longitudinal or end movement on the part of the shaft or spindle which carries the grinding-wheel. These three figures illustrate three different positions of the arm on the spindle which is engaged by said cam device. Fig. 10 is a detail illustrating the detachable plate or bracket which provides a support or bearing for the supplemental spindle upon which the springs are mounted. Fig. 11 shows the threaded end of the shaft or spindle and shows the collars and the arm which projects between the two springs in section. Fig. 12 is a perspective of the said arm which is mounted upon the shaft or spindle and which is arranged with its end between the adjacent ends of the two springs. Figs. 13, 14, and 15 illustrate a modified form of the spring device for causing the disk or grinding-wheel to exert a yielding pressure upon the saw-teeth. Figs. 16, 17, 18, and 19 illustrate another form of device for causing longitudinal shift or end movement on the part of the rotary shaft or arbor.

As thus illustrated, the saw-sharpening machine, in connection with which I have illustrated my invention, comprises a suitable frame or body structure A, adapted to support the grinding-wheel B and the feeding pawl or arm C in suitably-elevated positions. The said frame is constructed with a pair of oppositely-arranged guides $a\ a$, adapted to afford a support for the vertically reciprocating or shifting head D. This head carries the rotary shaft or spindle E, which latter is provided at its lower end with the said disk or grinding-wheel B. A belt-pulley $e$ or other suitable means can be employed for rotating the spindle and the grinding-wheel. The frame or body structure of the machine is also adapted to provide a suitable support or guideway for the saw F.

Referring to Figs. 1, 2, and 3, it will be understood that only a portion of the saw is shown and that the same may be either a straight or a band saw. As shown in said figures, the saw is preferably supported in a horizontal position with its toothed edge uppermost. Any suitable means can be employed for holding or guiding the saw—as, for example, the spring-pressed jaw or clamping member G. Supported in this position the said saw is given an intermittent forward or feeding movement by the pawl C, which latter, it will be readily understood, can be actuated in any suitable manner. In this way the toothed edge of the saw travels forward directly below the disk or grinding-wheel B. As shown in Fig. 1, the pawl or feeding device C has just fed the tooth $f$ into position to have its face engaged and ground by the disk or grinding-wheel and the said pawl or feeding device is just starting on its return movement to the right, as indicated by the arrow. In this said Fig. 1 it will be also seen that the disk or grinding-wheel B is just about to start downward for the purpose of allowing its edge or periphery to engage and grind the face of said tooth $f$. The vertical or up-and-down movement of the head can be accomplished in any suitable manner—as, for example, by providing a cam H, adapted to engage the roll $h$ on the lower end of the rod or pitman $h'$. This rod or pitman, it will be observed, has its upper end secured to a suitable portion of the head D, and through the medium of this rod and the roll $h$ the cam H is enabled to move the head up and down, so as to bring the disk or grinding-wheel into successive engagement with the saw-teeth.

Referring now more particularly to Figs. 4, 5, and 6, it will be seen that with my improved arrangement the forward end of the shaft or spindle E is preferably provided with a laterally-projecting arm $e'$. This arm can be secured in place upon the said shaft or spindle in any suitable manner—as, for example, by clamping or securing it between a pair of rings or collars $e^2$ and $e^3$. Arranged adjacent to this forward end of the said shaft or spindle is a bracket-plate I, which is secured in any suitable manner to the shifting head or support D. This bracket-plate, it will be observed, extends parallel with the said shaft or spindle and is provided with a central opening $i$, through which extends the said arm $e'$. This said arm, it will be readily understood, is so mounted on the shaft or spindle E that the latter is free to turn or rotate in the desired manner. In other words, this arm on the shaft or spindle is not rigid with the latter. This bracket-plate I is provided with outwardly-turned portions adapted to afford bearings for the supplemental spindle J. Preferably this supplemental spindle J is threaded and provided at each end with nuts $j'$ and $j''$. It will also be observed that the said supplemental spindle J is provided with nuts $j^2$ and $j^3$, which are arranged inside of the bearings provided by the bracket-plate I. With the provision of these nuts $j^2$ $j^3$ it will be seen that the tension of the two coil-springs can be readily varied so as to vary the degree or extent of yielding pressure which the grinding or abrading wheel exerts upon the saw-teeth. The nuts $j'$ $j''$ are arranged, it will be observed, so as to prevent longitudinal or end movement on the part of this supplemental spindle J. Between the nuts $j^2$ and the nuts $j^3$ are arranged, preferably, a couple of coil-springs $j^4$ $j^5$. The end of the arm $e'$ is interposed between the opposing ends of these two coil-springs, and at this point the supplemental spindle is preferably provided with an enlargement or shoulder $j^6$. Between the springs and this shoulder the washers $j^7$ and $j^8$ are preferably arranged, as shown in said Figs. 4, 5, and 6. The said shaft or spindle E is mounted in bearings on the sliding or shifting head D and is free to slide or shift endwise in said bearings. It will be seen, therefore, that with this arrangement a longitudinal or endwise shift on the part of said shaft or spindle will cause either one of the two springs $j^4$ and $j^5$ to be compressed, according to the direction in which the said shaft or spindle is shifted. In Figs. 1 and 4 the spindle or shaft and the springs are shown in their normal condition, neither of the springs being compressed. In Figs. 2 and 5, however, the shaft or spindle is shown shifted to the right, or, in other words, to the rear, and in this case the spring $j^5$ is compressed between the nuts $j^3$ and the arm $e'$, while the spring $j^4$ is allowed to remain in its normal condition. In Figs. 3 and 6 the shaft or spindle is shown shifted forward or to the right, and in this case the spring $j^4$ is compressed, while the spring $j^5$ is permitted to retain its normal condition. Thus it will be seen that the said springs are arranged to yieldingly hold the shaft or spindle against longitudinal or end movement, and consequently to yieldingly hold the rotary disk or grinding-wheel against movement in the direction of its axis. Referring to Figs. 7, 8, and 9 and the said Figs. 4, 5, and 6, it will also be seen that the shaft or spindle E is caused to shift longitudinally or in an endwise direction by reason of its arm $e'$ being brought into engagement upon the downward shift of the head with a cam device K. This, as previously stated, is for the purpose of causing the spindle or shaft and the grinding-wheel to shift rearward when the head is moved downward, so as to enable the periphery or edge of the grinding-wheel to properly approach the face of the tooth. Referring to said figures, it will be seen that the opposite end of the said arm $e'$ is adapted to engage the cam device K upon the downward movement of the head D and that the said cam device is adapted to act as a wedge for crowding the shaft or spindle rearward relatively to the said head and also relatively to the saw. Preferably this cam device is in the nature of a dog pivoted to one of the guideways $a$ and controlled by a spring $k$ and adapted to have its upper or free end rest in a notch in the flange $a'$. When the head D moves down, the small projecting end of the arm $e$ strikes the beveled or inclined surface of this cam device K, and thereby causes the said shaft or spindle to shift in the manner shown in Fig. 5. When the head D moves upward, however, the end of the arm $e'$ moves upward between the cam device and the flange or wall $a'$ of the said guideway, thereby permitting the said head to rise without causing any longitudinal shift or endwise movement on the part of the shaft or spindle. In this way the cam device only acts to shift the spindle upon the downward movement of the head and does not operate upon the upward shift of the said head. In other words, the pivoted cam device K serves as a means for positively shifting the grinding-disk in one direction. When the frame carrying the shaft upon which the grinding-disk is mounted is lowered, the cam device K then operates to positively shift the disk forward—that is to say, toward the feed-finger C; but when the frame and shaft carrying the disk move upward, then the said cam device is inoperative to produce any movement on the part of the disk. Thus it will be seen that I not only provide suitable springs for enabling the disk or grinding-wheel to exert a yielding pressure upon the teeth of the saw, but that I also provide means, preferably in the nature of a cam, for positively shifting the grinding-wheel so as to enable the latter to properly approach the face of a saw-tooth. In Figs. 2 and 5 the head is nearly at the limit of its downstroke, and said cam device is holding the shaft or spindle and the grinding-wheel in a shifted position. In Fig. 3, however, the said cam device has released the spindle and allowed the grinding-wheel to engage the face of a saw-tooth and the head D has moved downward to the limit of its stroke, so as to bring the edge or periphery of the grinding-wheel to the bottom of the notch between the two teeth.

In Figs. 13, 14, and 15 the construction is substantially the same as that shown in the preceding figures, except that in this case only one spring is employed. With this arrangement the spring $j^4$ of the previous construction is dispensed with and the shaft or spindle is controlled entirely by the spring $j^5$. Moreover, in Figs. 13, 14, and 15 it will be seen that the supplemental spindle and the spring are arranged above the shaft or spindle E rather than in front, as shown in Figs. 1, 2, and 3. With the arrangement shown in Figs. 13, 14, and 15 the rotary disk or grinding-wheel B will only exert a spring-pressure upon the face of a tooth. In the construction shown in Figs. 1, 2, and 3 and in Figs. 4, 5, and 6, however, the rotary disk or grinding-wheel is capable of exerting a spring or yielding pressure upon both the back and face of a saw-tooth. As shown in Fig. 13, for example, the spring $j^5$ is adapted to yield slightly when the grinding-disk B engages the face of the tooth $f$, as shown in this figure; but with this arrangement there is no yielding action on the part of the grinding-disk when its periphery strikes the back of the succeeding tooth. The nuts $j^2$ are adapted to regulate the tension of the spring $j^5$. The rod J has of course a sliding bearing in the bracket-support I. Thus, as stated, when the periphery of the grinding-disk engages the face of a tooth it is capable of yielding in order to prevent the disk from pressing too hard on the tooth. It will also be seen that the construction illustrated by Figs. 13, 14, and 15 does not include the cam device illustrated in the other figures. Thus in the construction shown in Figs. 13, 14, and 15 the spring, through the medium of the longitudinally-movable spindle E, acts merely to cushion or ease the pressure of the grinding-wheel upon the face of a tooth. This yielding or cushioning effect is due, it will be seen, to the fact that the grinding-wheel not only moves downward in engaging the face of a tooth, but, owing to the oblique arrangement of the frame, moves slightly forward—that is to say, in the direction of the feeding movement of the saw. Thus, as stated, the grinding-wheel in engaging the face of the tooth is capable of being wedged or crowded outwardly slightly against the tension of the spring.

In operation the disk or grinding-wheel B moves downward to the position shown in Fig. 1, and as it moves downward the cam K causes this disk or wheel to assume the position shown in Fig. 2. In this said Fig. 2 it will be seen that the edge of the grinding-wheel is substantially between the point of the tooth to be ground and the next succeeding tooth. The head D continuing to move downward, the cam device K releases the shaft or spindle and allows the disk or grinding-wheel to move forward into engagement with the face of the tooth $f$. The head D then continues to move downward, and in so doing causes the grinding-wheel to grind the entire surface of the face of the said tooth. The cam device which operates the head is preferably adapted to bring the edge or periphery of the grinding-wheel just to the bottom of the notch between the two teeth, as shown in Fig. 3. In engaging the said tooth the spring $j^5$ allows the disk or grinding-wheel to exert a yielding pressure upon the face of the tooth, and in this way insures against breakage or undue grinding and against the case-hardening which might result from undue friction and heating. From the position shown in Fig. 3 the pawl or feeding device then moves the saw forward, and in so doing the edge or periphery of the disk or grinding-wheel B is brought into contact with the back of the tooth $f'$, which, it will be observed, is the succeeding tooth. The cam device then starts the head D upward, and in riding up the inclined or sloping back of said tooth $f'$ the disk or grinding-wheel exerts a yielding or spring pressure, due to the tension of the spring $j^4$. In this way the teeth of the saw may vary somewhat with respect to both size and shape, and there may also be some variation in the feeding movement of the saw; but such variations will not result in breakage of the teeth nor in unduly grinding or cutting them away nor in the case-hardening which would result from heating, due to great pressure and friction. In other words, the springs permit the disk or grinding-wheel to automatically yield and adjust itself with respect to either variations in the size and shape of the teeth or with respect to variations in the manner in which the teeth are presented to the grinding-wheel by the pawl or feeding device C. Furthermore, the cam device K causes the disk or grinding-wheel to move downward to a point between the two teeth rather than directly downward upon a point in the face of the tooth to be sharpened. This insures against breakage in case the tooth is larger than the others or in case the tooth is not fed to the proper position. The cam device then releases the grinding-wheel and allows the latter to move forward in a direction which is more or less at right angles with the face of the tooth, and the springs then cause the disk to exert a yielding pressure upon the face of the tooth as the head moves downward for the purpose of carrying the edge or periphery of the disk to the bottom of the tooth. Thus it will be seen that with my invention I cause the disk or grinding-wheel to exert a yielding or spring pressure upon the teeth and that in so doing the teeth are not liable to be broken or case-hardened. Furthermore, it will be seen that my invention is applicable either in the form of an attachment or in the form of a machine constructed in accordance with the principles of my invention. In the drawings the invention is shown in the form of an attachment, it being obvious that the bracket-plate carrying the supplemental spindle and the springs can be readily attached to any machine of the type shown and described. As previously stated, the nuts $j^2$ and $j^3$ serve as adjusting devices for adjusting or regulating the tension of the coil-springs $j^4$ and $j^5$. In this way the spring or yielding member of the grinding or abrading wheel upon the saw-teeth can be readily varied in accordance with the character of the work. It will also be seen at this juncture that this spring or yielding pressure of the abrading-wheel upon the teeth insures a proper grinding or sharpening of the teeth, regardless of variations or inequalities in said abrading-wheel. It will be readily understood that the grinding or abrading wheel—such, for example, as an emery-wheel—is, when in use, constantly wearing away and that for this reason it is desirable that suitable means be provided whereby the saws can be sharpened without readjustment of the machine. This is accomplished by providing the said springs, which neutralize or counteract this wearing away of the abrading-wheel and which also, as previously explained, permit the abrading-wheel to automatically adjust itself with reference to variations in the size and shape of the teeth and also with respect to variations in the feeding movement of the saw. Broadly considered, therefore, my invention contemplates a saw-sharpening machine in which a sharpening member is controlled by spring tension in such manner as to yieldingly engage the saw-teeth.

My invention further contemplates, as it will be readily seen, a saw-sharpening machine in which a sharpening member is given a movement first at right angles to the saw and then in a direction parallel with the saw, so as to enable it to properly approach the face of a saw-tooth.

More specifically considered, my invention contemplates a saw-sharpening machine in which the shaft or spindle carrying a grinding-wheel is mounted and arranged for longitudinal shift or end movement. It further contemplates, as a specific feature, a cam device adapted to coöperate with a longitudinally-shifting spindle or shaft in moving the grinding-wheel in the direction of its axis, so as to enable it, as stated, to properly approach the face of a saw-tooth.

In Figs. 16, 17, 18, and 19 the two springs L and L' operate substantially in a manner similar to the springs shown in the preceding views. In this case it will be seen, however, that the said springs are mounted upon the stationary guideway in which the reciprocating head slides, rather than upon said head. With this arrangement the said springs L and L' are preferably arranged upon a rod or spindle M, which latter is mounted in bearings formed on a bracket-plate N. This bracket-plate is preferably secured to one of the guides or to some other suitable portion of the frame or body structure. Adjusting-nuts $l$ and $l'$ are also provided, as in the previous constructions, so as to permit the tension of the springs to be varied or regulated for the purpose of varying or changing the yielding pressure of the abrading-wheel upon the saw-teeth. Thus applied and arranged the opposing ends of said springs can be arranged to bear on opposite sides of a swinging arm O, which is preferably pivoted at its upper end and carried by the said bracket-plate. This said swinging arm O is provided as a means for causing a positive longitudinal or end shift on the part of the shaft or arbor, and is therefore preferably in the nature of a cam device, it being observed that its middle portion $o$ is bent or inclined to provide a sort of cam for engaging the rolls P and P'. These said rolls, it will be observed, are carried in a suitable bearing-block or mounting secured to the outer end of the said shaft or rotary arbor. These rolls are arranged to oppose each other on the opposite sides of the said swinging arm O, and when the vertically reciprocating or sliding head is moved up and down the rolls engage the bent or inclined portion of the said arm, and thereby cause the desired longitudinal or end movement on the part of the shaft or arbor. In this way, as in the previous constructions, the shaft or arbor is given a positive longitudinal or end movement when the head moves up and down, and this positive longitudinal or end movement causes the rotary disk or abrading-wheel to approach the face of the teeth in the desired manner. In other words, when the head moves downward the edge of the disk or abrading-wheel first comes substantially midway between two of the saw-teeth, and a further downward movement on the part of the head then enables the cam device to shift the shaft or arbor in such manner as to cause the disk or abrading-wheel to move forward into contact with the face of the tooth to be ground. If desired, the roll P' can be backed by springs $p'$, so as to permit the ready insertion of the arm O between the rolls and so as to further insure the proper operation of the devices. With respect to the application of my invention in the form of an attachment the holder or mounting Q for the said rolls can be secured to the end of the shaft or arbor by means of a coupling R. Preferably the said holder or mounting is provided with a headed stem $q$, and the said coupling R is preferably in the nature of a cup or collar for clamping the head of said stem tightly to the end of the shaft or arbor. In the arrangement thus shown it will be seen that the cam device is also subject to spring-pressure and that, as a matter of fact, the arrangement involves the application of spring tension to the shaft or arbor through the medium of a shifter and that this shifter is, as stated, preferably in the nature of a cam device. My invention therefore further contemplates the application of spring-pressure to the grinding or abrading wheel through the medium of a shifter capable of causing a positive or longitudinal shift or end movement on the part of the shaft or arbor. It will also be seen that I provide an arrangement whereby stationary springs may be employed for causing the abrading-wheel to yieldingly engage the saw-teeth. Furthermore, and with the arrangement shown in Figs. 16, 17, 18, and 19, the shaft or arbor is moved longitudinally by a shifter or a device having a spring or yielding backing, whereby the abrading-wheel first moves downward, so that its edge comes between two of the saw-teeth, and whereby said abrading-wheel then moves forward in a direction more or less parallel with the saw, so as to carry its edge into direct engagement with the face of the tooth to be ground. It will also be observed that in these figures the construction involves a swivel connection between the end of the shaft or arbor and the shifter or cam device for securing the desired movement of the abrading-wheel.

It will be readily understood that the broad idea of my longitudinally-adjustable and spring-impelled grinding-wheel shaft can be applied to and employed in connection with saw-sharpening machines of various kinds. The particular type of saw-sharpening machine in connection with which I have elected to illustrate my invention is of a well-known character and for this reason needs no further explanation nor illustration. The drawings fully illustrate my improved longitudinally-adjustable and spring-impelled grinding-wheel shaft and also the further or additional feature of improvement consisting of the cam device for effecting a movement of the grinding-wheel first in a direction substantially at right angles to the saw and then toward the face of the tooth by moving parallel or practically parallel with the saw. It will be understood that the illustration of the different parts of the machine which are old and common and well known is only fragmentary and of a more or less diagrammatic character for convenience of illustration.

What I claim as my invention is—

1. In a saw-sharpening machine, the combination of a shifting or movable head, a rotary shaft or spindle mounted in bearings upon said head, said bearings being adapted to permit longitudinal shift or end movement on the part of said shaft or spindle, a rotary disk or abrading-wheel mounted upon said shaft or spindle, a cam device arranged upon a suitable stationary support, means on the spindle for engaging said cam device, said cam device being adapted and arranged to effect an endwise shift on the part of said shaft when the head moves toward the saw, spring means adapted and applied to cause the said disk or abrading-wheel to yieldingly engage the saw-teeth, and a feeding device for intermittently feeding the saw and thereby successively presenting the saw-teeth in position to be properly engaged and abraded by said rotary disk or abrading-wheel.

2. In a saw-sharpening machine, the combination of a suitable frame or body structure, a sliding head mounted in guides on said frame or body structure, a longitudinally-movable shaft or arbor mounted in bearings on said sliding head, a disk or abrading-wheel mounted on said shaft or arbor, a cam device supported by a stationary portion of said frame or body structure and arranged to connect with or engage said rotary shaft or arbor, and spring means also supported by said frame or body structure and arranged to exert spring-pressure upon said cam device, so as to cause the disk or abrading-wheel to exert a yielding pressure upon the saw-teeth.

3. In a saw-sharpening machine, the combination of a rotary disk or abrading-wheel, suitable spring means, and a shifter forming a medium of connection between said spring means and said disk or abrading-wheel, said spring means causing said abrading-wheel to exert a yielding pressure on the saw-teeth, and said shifter acting to shift or move the said abrading-wheel in the direction of its axis.

4. In a saw-sharpening machine, the combination of a rotary disk or abrading-wheel, a shaft or arbor upon which said abrading-wheel is mounted, bearings for said shaft or arbor adapted to permit longitudinal or end movement of the latter, a shifting or sliding head on which said bearings are mounted, a pair of springs supported by a stationary portion of the machine, a swinging arm also supported by a stationary portion of the machine, the free end of said arm being interposed between said springs, and a connecting device carried by said shaft or arbor and adapted to traverse or move back and forth along the length of said arm, said arm being provided with a bent or inclined portion adapting the arm to serve as a cam device for causing longitudinal shift or end movement on the part of said shaft or arbor, and the said springs causing the disk or abrading-wheel to exert a yielding pressure upon the saw-teeth.

5. In a saw-sharpening machine, the combination of a rotary shaft or arbor, a disk or abrading-wheel mounted on said shaft or arbor, the latter being capable of longitudinal shift or end movement, suitable spring means, and suitable connections whereby said spring means cause said abrading-wheel to exert a yielding pressure upon the saw-teeth, and whereby said shaft or arbor is capable of longitudinal shift or end movement independently of and without compressing said spring means.

6. In a saw-sharpening machine, the combination of a rotary abrading-wheel, a shaft or arbor upon which said abrading-wheel is mounted, a shifting or sliding head adapted to carry said shaft or arbor, suitable spring means, and a bent arm and a swivel forming a medium of connection between said spring means and said shaft or arbor, so as to permit said spring means to cause the abrading-wheel to exert a yielding pressure upon the saw-teeth, and whereby the said shaft or arbor is given a longitudinal shift or end movement when the said head reciprocates or moves back and forth.

7. In a saw-sharpening machine, the combination of an abrading-wheel, a rotary shaft or arbor upon which said abrading-wheel is mounted, a reciprocating head upon which said shaft or arbor is mounted, a pair of coil-springs, a bent arm pivoted at one end and having its free end interposed between the opposing ends of said springs, a holder or mounting carrying rolls arranged at opposite sides of said arm, and a swivel connection between said holder or mounting and the end of said shaft or arbor, whereby the springs cause the abrading-wheel to exert a yielding pressure upon the saw-teeth, and whereby the said arm operates to shift or move the said arbor longitudinally when the said head moves or reciprocates back and forth.

8. A saw-sharpening machine comprising a rotary and axially-movable sharpening or abrading member, means for moving said member into and out of engagement with the saw, and spring means adapted and applied for causing the said sharpening or abrading member to exert a bodily and axially yielding pressure upon the teeth of the saw to be sharpened.

9. A saw-sharpening machine comprising an axially-movable abrading member, said member being adapted to engage and operate upon both the back and face of a saw-tooth, means for moving the said member toward and away from the saw, and a pair of springs adapted and arranged to exert tension in opposite directions, and adapted and applied for causing the said sharpening or abrading member to exert a bodily and axially yielding pressure upon both the backs and faces of the saw-teeth.

10. A saw-sharpening machine comprising a rotary grinding or abrading wheel, a shaft or spindle upon which said wheel is mounted, bearings which support said shaft or spindle for longitudinal or end movement, a feeding device for feeding the saw, means for moving said wheel into and out of engagement with the saw, and a spring adapted and applied for opposing longitudinal or end shift on the part of said shaft or spindle, said spring being thereby adapted to cause the said grinding or abrading wheel to exert a bodily and axially yielding pressure upon the teeth of the saw to be sharpened.

11. A saw-sharpening machine comprising means for feeding the saw, a rotary grinding or abrading wheel, said wheel being supported for axial movement, means for bringing said wheel into and out of engagement with the saw, and spring means for opposing such axial movement on the part of said grinding or abrading wheel, said wheel being thereby adapted to exert a bodily-yielding pressure upon the teeth of the saw to be sharpened.

12. A saw-sharpening machine comprising a shifting or reciprocating head, a spindle or shaft mounted in bearings upon said head, said shaft or spindle being mounted for longitudinal shift or end movement, a grinding-disk or abrading-wheel mounted upon said shaft or spindle, means for shifting said head and thereby moving said wheel into and out of engagement with the saw, spring means adapted and arranged to oppose longitudinal or end shift on the part of said shaft or spindle, said disk or abrading-wheel being thereby adapted to exert a yielding pressure upon the teeth of the saw to be sharpened, and a feeding device for giving the saw an intermittent feeding movement, so as to successively present the teeth of the saw to the said disk or abrading-wheel.

13. A saw-sharpening machine comprising a longitudinally-movable rotary shaft or spindle, a supplemental spindle held against longitudinal or end movement, an arm on said rotary shaft or spindle, springs suitably connected with said supplemental spindle arranged to oppose each other at opposite sides of said arm, a feeding device for feeding the saw and successively presenting the saw-teeth in position to be ground or sharpened, a grinding-disk or abrading-wheel mounted upon said rotary shaft or spindle, and means for bringing the said wheel into and out of engagement with the saw, the said springs being adapted to yieldingly oppose longitudinal movements, of said shaft or spindle, and to thereby permit the said disk or abrading-wheel to exert a yielding pressure upon the teeth of the saw.

14. A saw-sharpening machine comprising a suitable sharpening or abrading member, means for bringing the member into and out of engagement with the saw, a feeding device for intermittingly feeding the saw and successively presenting the saw-teeth in position to be sharpened, and means including a cam device for effecting a movement of the said sharpening or abrading member first in a downward direction and then toward the face of a tooth.

15. A saw-sharpening machine comprising a rotary disk or abrading-wheel means for moving the wheel into and out of engagement with the saw, a feeding device for feeding the saw and successively presenting the teeth in position to be engaged by said abrading-wheel, and means including a shifter for effecting a movement of the said disk or abrading-wheel first in a downward direction and then toward the face of a tooth.

16. In a saw-sharpening machine, the combination of a longitudinal or endwise-movable shaft or spindle, a rotary disk or abrading-wheel mounted upon said shaft or spindle, means including a movable member upon which the said shaft or spindle is mounted for moving the wheel into and out of engagement with the saw, a feeding device for intermittingly feeding the saw and thereby successively presenting the teeth in position to be engaged by said abrading-wheel, a suitably-supported cam device, and means on the spindle for engaging said cam device to cause the disk or abrading-wheel to first present its edge between two of the saw-teeth, and to then move toward and into engagement with the face of a tooth.

17. As an attachment for a saw-sharpening machine having a rotary and axially movable sharpening or abrading member, a bracket-plate and supplemental spindle carrying a pair of coil-springs adapted to exert tension in opposite directions, and means whereby the springs yieldingly hold the said abrading member against bodily axial movement, said springs thereby being capable of causing said sharpening or abrading member to exert a yielding pressure upon the teeth of the saw to be sharpened.

18. In a saw-sharpening machine, the combination of a feeding device for intermittingly feeding the saw and thereby successively presenting the saw-teeth in position to be ground or sharpened, and a sharpener or abrading member capable of both rotary movement and bodily axial shift, means for bringing said member into and out of engagement with the saw, means including a spring adapted and applied for causing said sharpener or abrading member to exert a yielding pressure upon the teeth of the saw, and a nut for regulating the tension of the spring.

19. In a saw-sharpening machine, the combination of a rotary abrading-wheel, means for holding a saw in position to be engaged by said abrading-wheel, a longitudinally-movable shaft or spindle upon which the said abrading-wheel is mounted, means for bringing said wheel into and out of engagement with the saw, spring means suitably connected with said shaft or spindle, said spring means causing said abrading-wheel to exert a yielding pressure upon the teeth of the saw, and adjusting-nuts for varying the tension of said spring means.

20. In a saw-sharpening machine, a rotary and axially movable disk or abrading-wheel, feeding mechanism for intermittingly feeding the saw and thereby successively presenting the saw-teeth to said rotary disk or abrading-wheel, suitable means for bringing said wheel into and out of engagement with the saw-teeth, spring means and a stationary member upon which said spring means are mounted, and suitable connections between said spring means and said rotary disk or abrading-wheel, whereby said spring means are adapted to cause said abrading-wheel to exert a yielding pressure upon the saw-teeth.

21. In a saw-sharpening machine, the combination of a suitable frame or body structure, a sliding head mounted in guides on said frame or body structure, a rotary shaft or arbor supported for longitudinal or end movement in bearings on said sliding head, an abrading-wheel mounted upon said shaft or arbor, means for moving said head and thereby bringing said wheel into and out of engagement with the saw-teeth, spring means supported by a stationary portion of said frame or body structure, and suitable connections between said spring means and said shaft or arbor, whereby said spring means are adapted to cause said abrading-wheel to exert a yielding pressure upon the saw-teeth.

22. In a saw-sharpening machine, the combination of an abrading-wheel, a rotary shaft or arbor upon which said abrading-wheel is mounted, a movable frame upon which the shaft is mounted, said shaft or arbor being capable of longitudinal shift or end movement, means for moving said frame and thereby bringing said wheel into and out of engagement with the saw-teeth, and a spring-backed cam device adapted and arranged for yieldingly causing longitudinal shift or end movement on the part of said shaft or arbor when said frame is moved.

23. A saw-sharpening machine comprising an inclined frame, an inclined shaft mounted in bearings on said frame, said shaft being capable of a longitudinal or end movement in said bearings, an abrading-wheel mounted on said shaft, a stationary frame on which said inclined frame is mounted for upward and downward movement, a spring connection between said shaft and said stationary frame, said spring connection serving as a means for yieldingly and normally holding said shaft against endwise movement in said bearings, and means for supporting a saw in position to be operated upon by said abrading-wheel.

Signed by me at Chicago, Cook county, Illinois, this 27th day of November, 1901.

JAMES HARRY SEEK.

Witnesses:
 ARTHUR F. DURAND,
 HARRY P. BAUMGARTNER.